United States Patent
Miller

(10) Patent No.: US 10,030,528 B2
(45) Date of Patent: Jul. 24, 2018

(54) FLANGED SPRING GUIDE FOR A FACE SEAL ARRANGEMENT

(71) Applicant: United Technologies Corporation, Farmington, CT (US)

(72) Inventor: Jonathan Logan Miller, Ware, MA (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 15/110,251

(22) PCT Filed: Nov. 12, 2014

(86) PCT No.: PCT/US2014/065198
§ 371 (c)(1),
(2) Date: Jul. 7, 2016

(87) PCT Pub. No.: WO2015/105574
PCT Pub. Date: Jul. 16, 2015

(65) Prior Publication Data
US 2016/0333711 A1    Nov. 17, 2016

Related U.S. Application Data

(60) Provisional application No. 61/925,005, filed on Jan. 8, 2014.

(51) Int. Cl.
*F01D 11/00* (2006.01)
*F02C 7/28* (2006.01)
(Continued)

(52) U.S. Cl.
CPC .............. *F01D 11/003* (2013.01); *F02C 7/28* (2013.01); *F04D 29/122* (2013.01);
(Continued)

(58) Field of Classification Search
CPC ........ F01D 11/003; F02C 7/28; F04D 29/122; F16J 15/3452; F05D 2220/32; F05D 2240/60
See application file for complete search history.

(56) References Cited

U.S. PATENT DOCUMENTS 2,990,202 A     7/1961   Dennison
3,025,115 A *   3/1962   Shevchenko ......... F01D 11/003
                                                        184/6.26
(Continued)

FOREIGN PATENT DOCUMENTS

EP    0589138 A2    3/1994
EP    2138705 A1    12/2009
GB    2135758 A     9/1984

OTHER PUBLICATIONS

International Search Report for International Application No. PCT/US2014/065198; dated Feb. 16, 2015.
(Continued)

*Primary Examiner* — Eugene G Byrd
(74) *Attorney, Agent, or Firm* — Cantor Colburn LLP

(57) ABSTRACT

A spring guide for use in a seal housing including a first body portion, a second body portion, and a flange portion, including a flange width, extending circumferentially between the first body portion and the second body portion. The flange width being less than or equal to approximately 2.1 millimeters.

11 Claims, 5 Drawing Sheets

(51) Int. Cl.
*F04D 29/12* (2006.01)
*F16J 15/34* (2006.01)

(52) U.S. Cl.
CPC ....... *F16J 15/3452* (2013.01); *F05D 2220/32* (2013.01); *F05D 2240/60* (2013.01)

(56) References Cited

U.S. PATENT DOCUMENTS

| | | | | |
|---|---|---|---|---|
| 4,063,741 A | * | 12/1977 | Kerr | F16J 15/36 |
| | | | | 277/373 |
| 4,377,290 A | * | 3/1983 | Netzel | F16J 15/3484 |
| | | | | 277/368 |
| 4,795,572 A | * | 1/1989 | LaValley | B01D 33/067 |
| | | | | 210/232 |
| 5,464,227 A | * | 11/1995 | Olson | F16J 15/3404 |
| | | | | 277/400 |
| 5,863,047 A | * | 1/1999 | Ellis | F16J 15/348 |
| | | | | 277/374 |
| 6,161,452 A | | 12/2000 | Hilber | |
| 6,196,790 B1 | | 3/2001 | Sheridan | |
| 7,837,199 B2 | | 11/2010 | Craig et al. | |
| 7,984,911 B2 | * | 7/2011 | Dobek | F16J 15/3404 |
| | | | | 277/399 |
| 8,215,894 B2 | | 7/2012 | Miller et al. | |
| 9,546,560 B2 | * | 1/2017 | Larson | F01D 11/003 |
| 2007/0096398 A1 | | 5/2007 | Miller | |
| 2010/0201074 A1 | * | 8/2010 | Haynes | F16J 15/441 |
| | | | | 277/361 |

OTHER PUBLICATIONS

Written Opinion for International Application No. PCT/US2014/065198; dated Feb. 16, 2015.
European Search Report for Application No. 14877789.9-1610/3094826 PCT/US2014065198; dated Dec. 10, 2017, 8 pages \* cited by examiner

FLANGED SPRING GUIDE FOR A FACE SEAL ARRANGEMENT

CROSS REFERENCE TO RELATED APPLICATION

The present application is a National Phase Application of Patent Application PCT/US2014/065198 filed on Nov. 12, 2014, which claims the priority benefit of U.S. Provisional Patent Application No. 61/925,005, filed Jan. 8, 2014. The contents each of which are is hereby incorporated by reference in its their entirety into this application.

TECHNICAL FIELD OF THE DISCLOSED EMBODIMENTS

The presently disclosed embodiments generally relate to a seal assembly, and more particularly to a flanged spring guide for a face seal arrangement.

BACKGROUND OF THE DISCLOSED EMBODIMENTS

Conventional mechanical seal assemblies are used in rotating equipment to provide a seal between regions of high and low fluid pressure and temperature. For example, seal assemblies are used to seal a rotating shaft on a pump, compressor, agitator, gas turbine, or other rotating equipment.

Gas turbine engine type rotational assemblies typically include (in serial flow communication) a fan section, a compressor section, a combustor section, and a turbine section. During operation, air is pressurized in the compressor section and mixed with fuel in the combustor section for generating hot combustion gases. The hot combustion gases flow through the turbine section which extracts energy from the hot combustion gases. In a multiple spool type gas turbine engine, a rotor assembly includes a high speed shaft and a low speed shaft that power the engine components using the energy extracted from the hot combustion gases.

In gas turbine engines, mechanical seal assemblies are used to prevent hot, high pressure air from entering a bearing compartment that operates at a low pressure and temperature. For example, a front bearing compartment in a multiple spool gas turbine engine is filled with an oil mist to lubricate the bearings that support the high speed rotor shaft and the low speed rotor shaft. The high speed rotor shaft and the low speed rotor shaft are separated by a gap filled with working medium gas. The working medium gas cools the rotor shaft. A seal assembly prevents the working medium gas from leaking into the oil compartment and prevents the oil mist from leaking out of the bearing compartment. The seal assembly typically includes a graphitic carbon ring mechanical face seal that seals the bearing compartment. Secondary seals may also be provided to limit leakage.

In order to provide adequate sealing, coil springs are used in the mechanical seal assemblies. Generally, the coil springs rest against a seal housing and compress (or bias axially) the mechanical face seal against the rotating seal seat which rotates with the shaft. However, in order to meet spring load requirements in the seal design, different springs with different compression forces are used and tested. The use of multiple types of springs increases design time, and potentially increasing costs of gas turbine engine hardware.

Accordingly, it is desirable to provide a seal assembly that may decrease design time, and reduce costs of gas turbine engine hardware.

BRIEF SUMMARY OF THE DISCLOSED EMBODIMENTS

In one aspect, a flanged spring guide for use in a seal assembly is provided. The spring guide includes a include a first body portion, a second body portion, and a flange portion extending circumferentially between the first body portion and the second body portion. The flange portion includes a flange portion width less than or equal to approximately 2.1 millimeters (0.080 inch), and a flange portion diameter less than or equal to approximately 12.7 millimeters (0.5 inch).

In one embodiment, the first body portion includes a first body cylindrical geometry. The first body cylindrical geometry includes a first body diameter less than or equal to approximately 5.3 millimeters (0.205 inch) and a first body height less than or equal to approximately 3.6 millimeters (0.140 inch). In one embodiment, the second body portion includes a second body cylindrical geometry. The second body cylindrical geometry includes a second body diameter less than or equal to approximately 8.5 millimeters (0.334 inch) and a second body height less than or equal to approximately 7.5 millimeters (0.295 inch).

In one aspect, a rotational assembly is provided. The rotational assembly includes a first rotor shaft, a second rotor shaft spaced apart from the first shaft, and at least one seal assembly extending circumferentially about the first rotor shaft and the second rotor shaft, the at least one seal assembly including: an annular seal housing including a plurality of spring guides circumferentially disposed thereon.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

Figure 1:
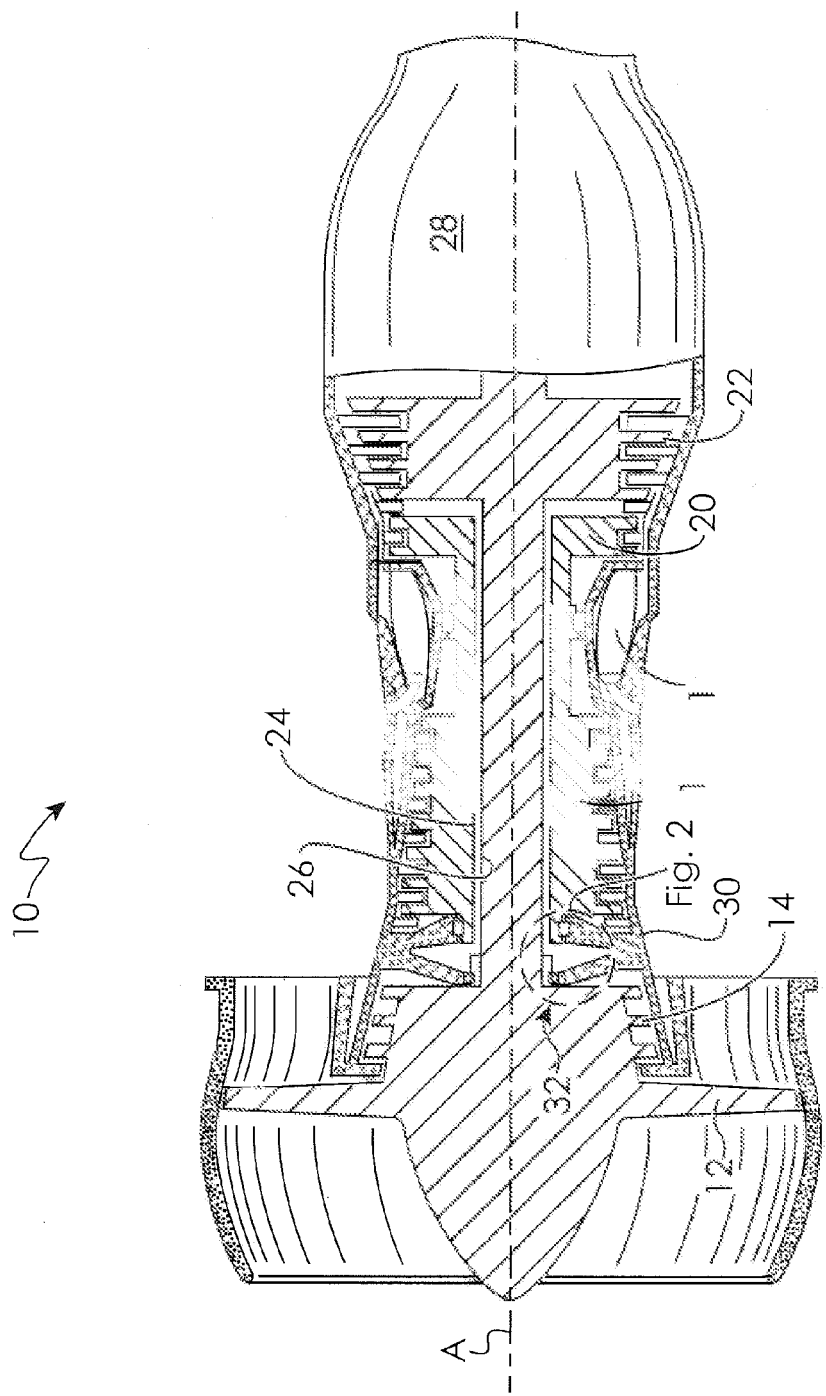
FIG. 1 is a general schematic view of a gas turbine engine.

An overview of the features, functions and/or configuration of the components depicted in the figures will now be presented. It should be appreciated that not all of the features of the components of the figures are necessarily described. Some of these non-discussed features, as well as discussed features are inherent from the figures. Other non-discussed features may be inherent in component geometry and/or configuration.

DETAILED DESCRIPTION OF THE DRAWINGS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates selected portions of an example rotational assembly 10, such as a gas turbine engine, for example. In this example, the rotational assembly 10 includes a fan section 12, a low pressure compressor 14, a high pressure compressor 16, a combustor 18, a high pressure turbine 20 and a low pressure turbine 22 each disposed coaxially about an engine centerline axis A. During operation, air is pressurized in the compressors 14, 16 and mixed with fuel in the combustor 18 for generating hot combustion gases. The hot combustion gases flow through the high and low pressure turbines 20, 22, which extract energy from the hot combustion gases. The high pressure turbine 20 powers the high pressure compressor 16 through a high speed rotor shaft 24 and the low pressure turbine 22 powers the fan section 12 and the low pressure compressor 14 through a low speed rotor shaft 26. The invention is not limited to the two spool actual gas turbine architecture described and may be used with other architectures, such as a single spool actual design, a three spool actual design and other architectures.

Core exhaust gases are discharged from the core engine through a core exhaust nozzle 28. An annular, non-rotatable case 30 supports the high speed rotor shaft 24 and the low speed rotor shaft 26 on a sealing arrangement 32.

Figure 2:
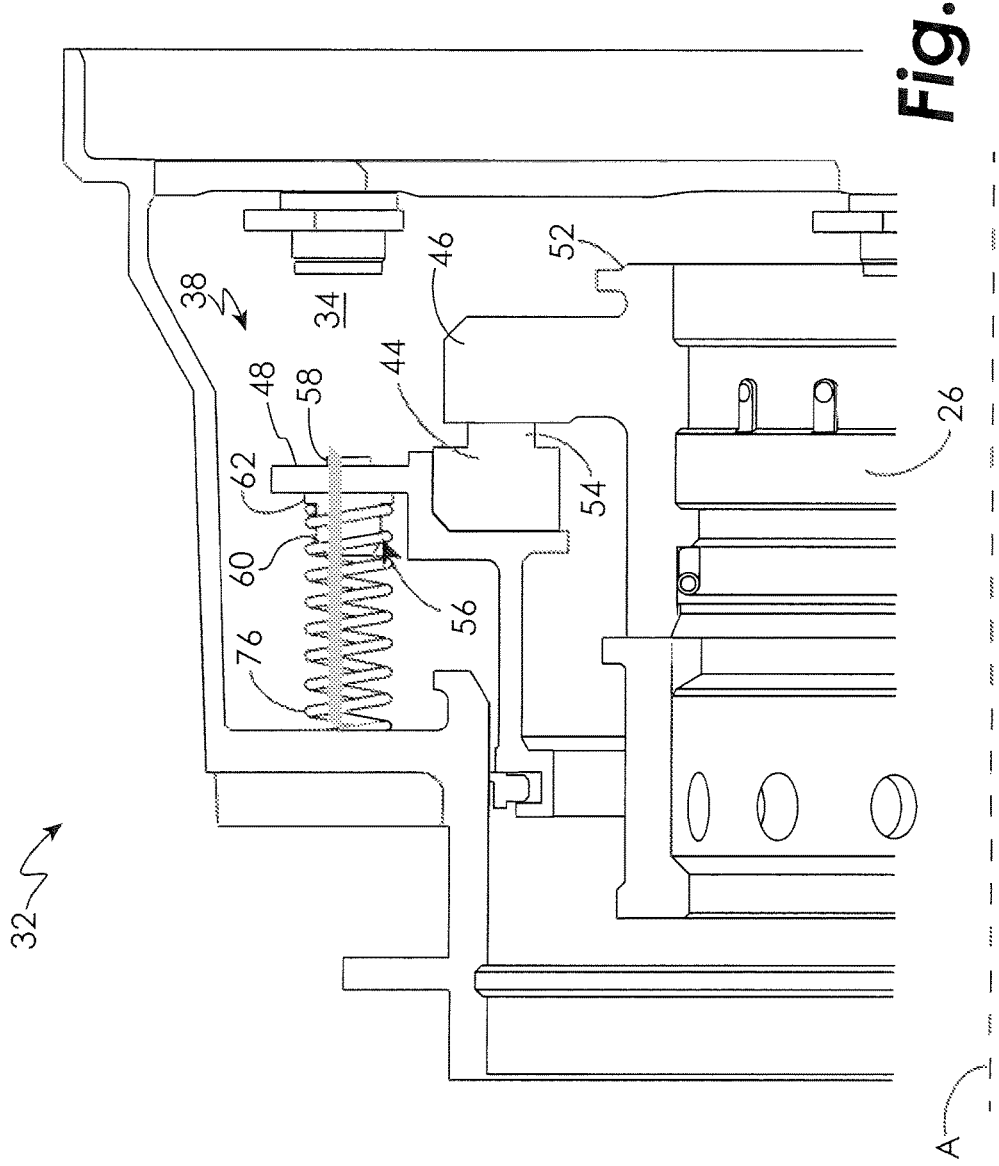
FIG. 2 is a cross-sectional diagram of a sealing arrangement according to an embodiment of the present disclosure.

FIG. 2 illustrates a sealing arrangement 32 of the rotational assembly 10. The sealing arrangement 32 includes a front bearing compartment 34. The bearing compartment 34 is filled with an oil mist from a suitable source to provide lubrication and cooling. The high speed rotor shaft 24 and the low speed rotor shaft 26 are spaced apart, thereby defining a gap (not shown). The gap is filled with working medium gas from either one or both of the compressor sections 14, 16, which cools the high and low speed rotor shafts 24, 26. The working medium gas in the gap is typically much warmer than the temperature inside the bearing compartment 34. The high speed rotor shaft 24 and the low speed rotor shaft 26 are co-axial and are co-rotating, in one example. In another example, the high speed rotor shaft 24 and the low speed rotor shaft 26 are counter-rotating.

A seal assembly 38 minimizes leakage of the relatively high temperature working medium gas out of the gap and into the bearing compartment 34. In addition, the seal assembly 38 minimizes the risk of the oil mist leaking out of the bearing compartment 34 into the gap. In this example, the seal assembly 38 is a single seal assembly for a gas turbine engine. However, it will be appreciated that the seal assembly 38 may be used in an intershaft arrangement. Although the example seal assembly 38 is shown and described herein for sealing certain components of a gas turbine engine, it should be understood that other rotational assemblies would benefit from the seal assembly 38 including, but not limited to, pumps, compressors, agitators, etc.

The example seal assembly 38 may extend circumferentially about the low speed rotor shaft 26 or extend circumferentially about the high speed rotor shaft 24. Each seal assembly 38 may be axially spaced within the bearing compartment 34. The seal assembly 38 provides the necessary sealing between the gap and the bearing compartment 34 of the rotational assembly 10.

The seal assembly 38 includes a seal element 44, a seal seat 46, and a seal housing 48. The seal seat 46 rotates with the low speed rotor shaft 26 or the high speed rotor shaft 24, depending on the application, while the seal element 44 remains static with the casing (not shown).

The seal seat 46 is retained against an abutment 52 on the high speed rotor 24 or the low speed rotor shaft 26. Therefore, the seal seat 46 is carried by and rotates with the high speed rotor shaft 24 or the low speed rotor shaft 26. The seal elements 44 each include a respective nose 54 that contacts the seal seats 46, when the seal housing 48 is biased toward the seal seat 46 in a sealing position. In one example, the seal elements 44 are annular seal elements, such as annular graphitic carbon rings. However, a person of ordinary skill in the art having the benefit of this disclosure would be able to select an appropriate seal type for the example seal assembly 38.

Figure 3:
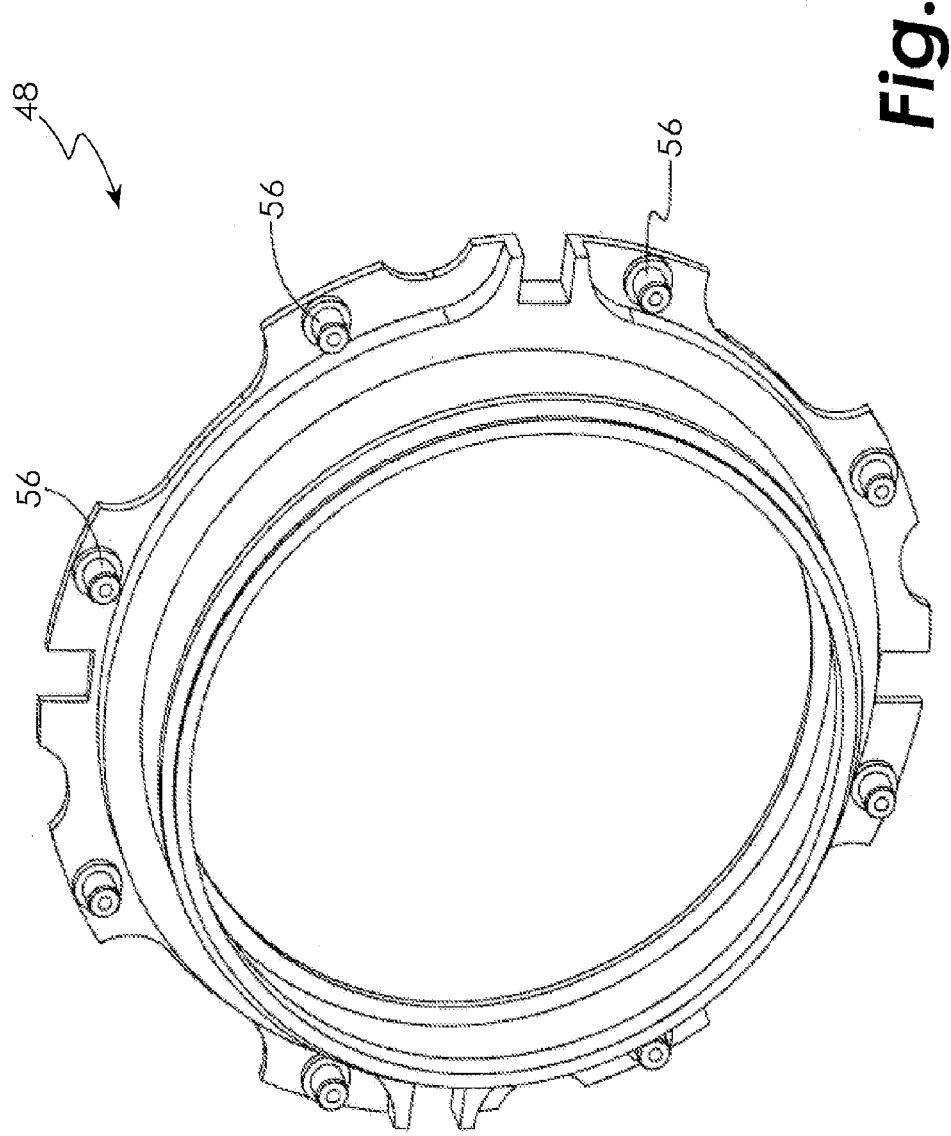
FIG. 3 is a perspective view of a seal housing with flanged spring guides according to an embodiment of the present disclosure.
Figure 4:
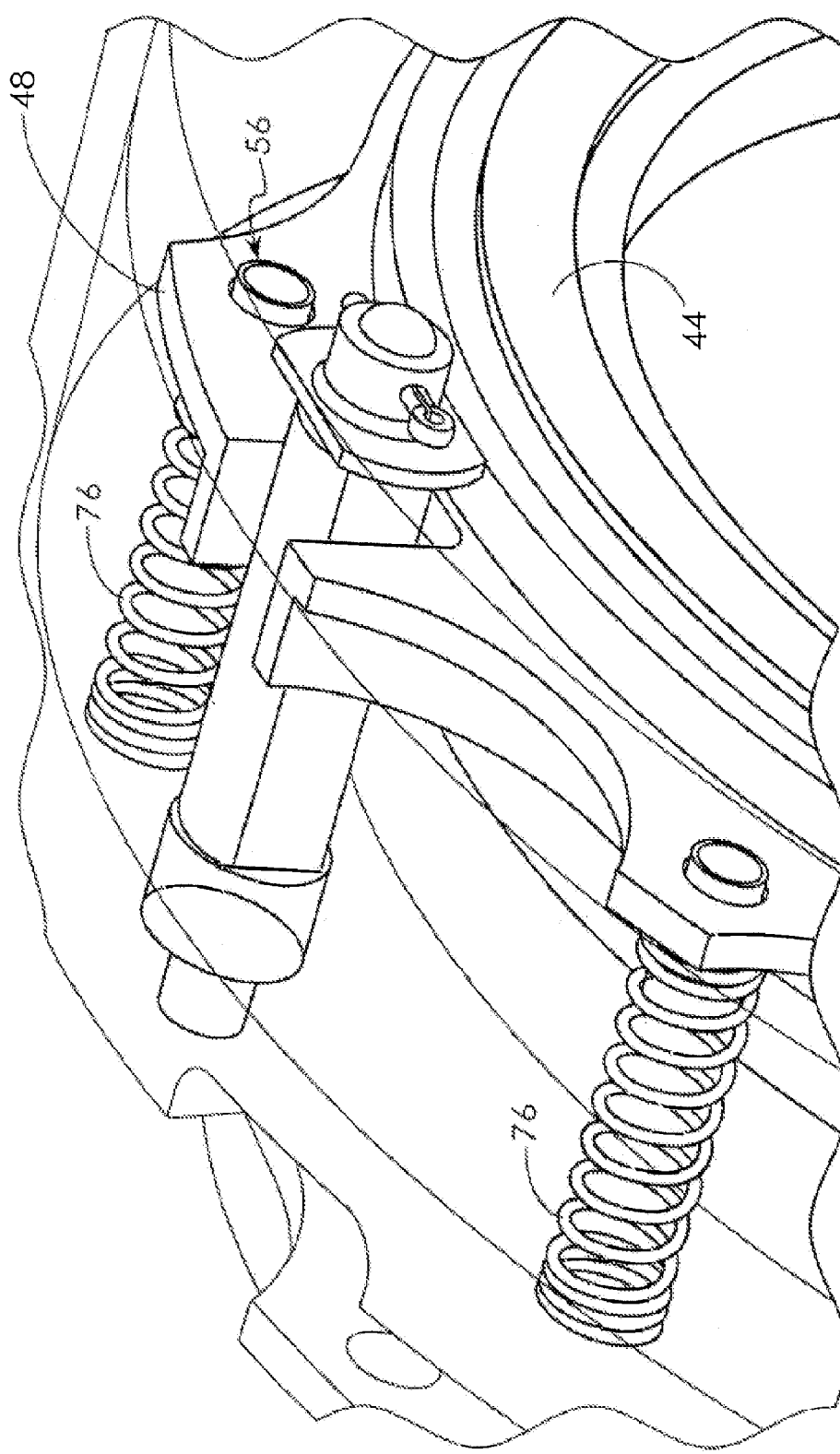
FIG. 4 is a perspective view of a seal housing according to an embodiment of the present disclosure.
Figure 5:
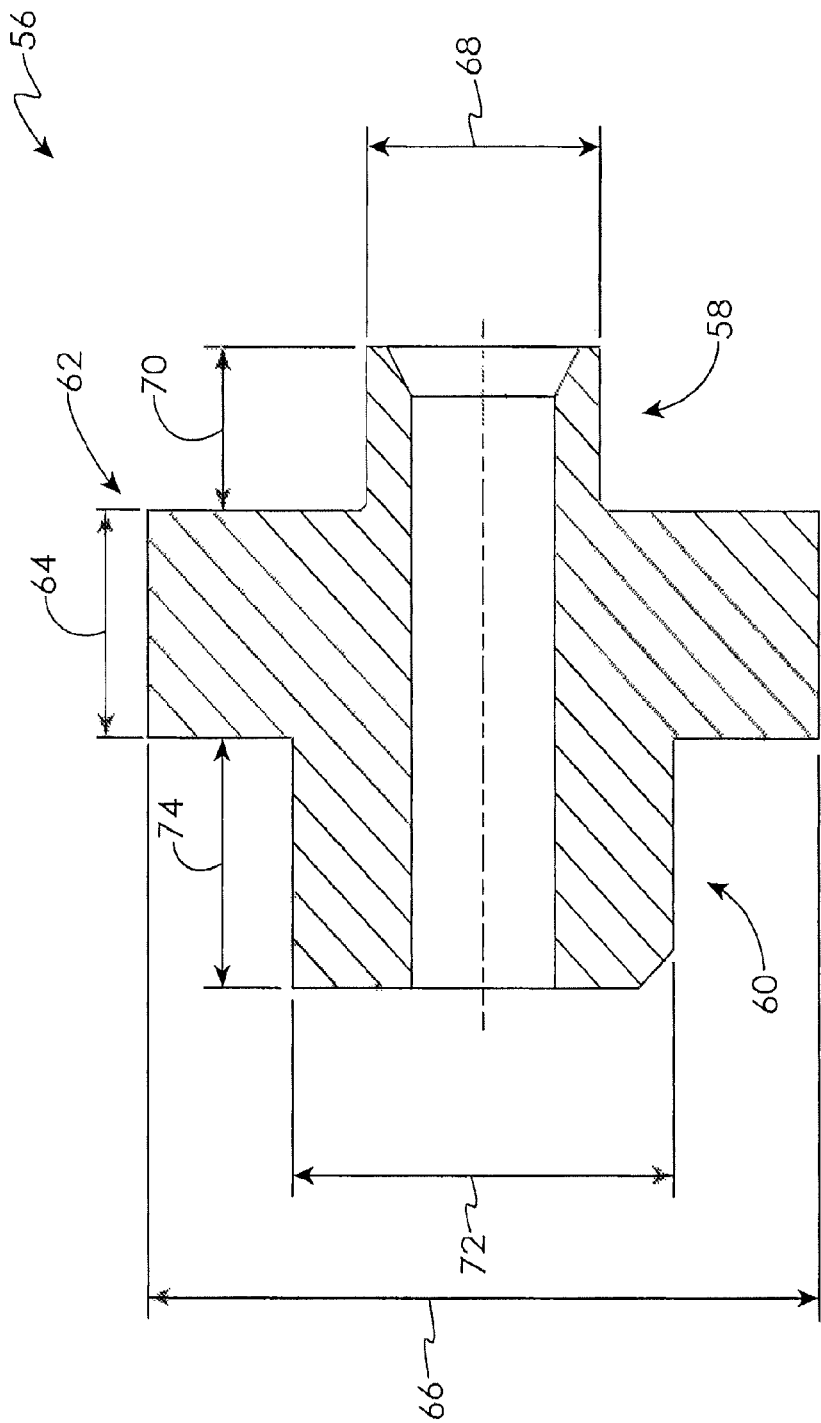
FIG. 5. is a cross-sectional diagram of a flanged spring guide according to an embodiment of the present disclosure.

As shown in FIGS. 2-4, the seal housing 48 include a plurality of circumferentially spaced coil spring guides 56. In one embodiment, as shown in FIG. 5 with continuing reference to FIGS. 2-4, the spring guides 56 include a first body portion 58, a second body portion 60, and a flange portion 62 extending circumferentially between the first body portion 58 and the second body portion 60. The coil spring guides 56 are assembled by passing the first body portion 58 through circumferentially spaced apertures on the seal housings 48. The spring guides 56 receive and retain coil springs 76. Moreover, the coil springs 76 bias the seal housing 48 axially to maintain positive contact between the seal element 44 and the seal seats 46.

In one embodiment, the flange portion 62 includes a flange width 64 less than or equal to approximately 2.1 millimeters (0.080 inch), and a flange diameter 66 less than or equal to approximately 12.7 millimeters (0.5 inch). In another embodiment, the flange width 64 may be greater than 2.1 millimeters (0.080 inch) and/or the flange diameter 66 may be greater than 12.7 millimeters (0.5 inch).

In one embodiment, the first body portion 58 includes a first body cylindrical geometry. The first body cylindrical geometry includes a first body diameter 68 less than or equal to approximately 5.3 millimeters (0.205 inch) and a first body height 70 less than or equal to approximately 3.6 millimeters (0.140 inch) in an embodiment. It will be appreciated that the first body diameter 68 may include any diameter suitable to pass through the apertures of the seal housing 48. It will also be appreciated that the first body height may be greater than 3.6 millimeters (0.140 inch) in some embodiments. In one embodiment, the second body portion 60 includes a second body cylindrical geometry. The second body cylindrical geometry includes a second body diameter 72 less than or equal to approximately 8.5 millimeters (0.334 inch) and a second body height 74 less than or equal to approximately 7.5 millimeters (0.295 inch) in an embodiment. It will be appreciated that the second body diameter 72 may include any diameter suitable to engage the coil spring 76 used for the seal assembly 38. It will be appreciated that the second body height is greater than 7.5 millimeters (0.295 inch) in some embodiments.

The coil springs 76 may be compressed an additional amount, equal to the flange width 64. The additional compression enables more design flexibility when spring load modifications are desired or required to meet spring load requirements in seal design on the rotational assembly 10 by expanding the number of coil springs 76 available for design consideration. A coil spring 76 may be used with a spring guide 56 not containing a flange portion 62. However, a new coil spring 76 would need to be substituted if a new coil spring 76 is required. By using a spring guide 56 having a flange portion 62 of a different flange width 64 differing spring loads may be applied to the same coil spring 76.

It will be appreciated from the present disclosure that the embodiments disclosed herein provide for a plurality of spring guides 56 including a flange portion 62 to enable additional compression of the coil springs; thus, enabling more design flexibility of the rotational assembly 10 and providing a cost savings for spring load modifications on the rotational assembly 10 by altering the flange width dimension 64 without the need to change the coil spring 76.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A bearing compartment for use in a rotational assembly comprising:
   a bearing housing;
   a seal assembly disposed within the bearing housing, the seal assembly comprising:
   an annular seal housing including a plurality of circumferentially disposed orifices having a first diameter and a plurality of spring guides respectively disposed therein;
   a plurality of coil springs, each of the plurality of coil springs having a second diameter, a first axial end and a second axial end, each first axial end being disposed against the bearing housing and each second axial end being disposed against one of the plurality of spring guides;
   wherein each of the plurality of spring guides comprises:
   a first body portion having a third diameter that is smaller than the first diameter, wherein each first body portion is respectively received within the plurality of annual seal orifices;
   a second body portion having a fourth diameter that is smaller than the second diameter, wherein each second body portion is respectively received within the plurality of coil springs; and
   a flange portion, including a flange width and a flange diameter, the flange diameter being larger than the second diameter, the flange portion extending circumferentially between the first body portion and the second body portion, the flange portion having a first axial surface and an opposing second axial surface, wherein each first axial surface is disposed against the annular seal housing and each second axial surface is respectively disposed against each second axial end of the plurality of coil springs.

2. The bearing compartment of claim 1, wherein the flange width is less than or equal to approximately 2.1 millimeters.

3. The bearing compartment of claim 1, wherein each flange portion further comprises a flange diameter less than or equal to approximately 12.7 millimeters.

4. The bearing compartment of claim 1, further comprising:
   a seal seat; and
   a seal element in contact with the seal seat and positioned between the seal seat and the seal housing.

5. The bearing compartment of claim 1, wherein the first body portion includes a cylindrical geometry, wherein the third diameter is a first body diameter that is less than or equal to approximately 5.3 millimeters and a first body height is less than or equal to approximately 3.6 millimeters.

6. The bearing compartment of claim 1, wherein the second body portion includes a cylindrical geometry, wherein the fourth diameter is a second body diameter that is less than or equal to approximately 8.5 millimeters and a second body height is less than or equal to approximately 7.5 millimeters.

7. A rotational assembly comprising:
   a first rotor shaft, a second rotor shaft spaced apart from the first shaft; and
   a bearing compartment, comprising:
   a bearing housing;
   a seal assembly disposed within the bearing housing, the seal assembly comprising:
   an annular seal housing including a plurality of circumferentially disposed orifices having a first diameter and a plurality of spring guides respectively disposed therein;
   a plurality of coil springs, each of the plurality of coil springs having a second diameter, a first axial end and a second axial end, each first axial end being disposed against the bearing housing and each second axial end being disposed against one of the plurality of spring guides;
   wherein each of the plurality of spring guides comprises:
   a first body portion having a third diameter that is smaller than the first diameter, wherein each first body portion is respectively received within the plurality of annual seal orifices;
   a second body portion having a fourth diameter that is smaller than the second diameter, wherein each second body portion is respectively received within the plurality of coil springs; and
   a flange portion, including a flange width and a flange diameter, the flange diameter being larger than the second diameter, the flange portion extending circumferentially between the first body portion and the second body portion, the flange portion having a first axial surface and an opposing second axial surface, wherein each first axial surface is disposed against the annular seal housing and each second axial surface is respectively disposed against each second axial end of the plurality of coil springs.

8. The rotational assembly of claim 7, wherein the flange diameter is less than or equal to approximately 2.1 millimeters.

9. The rotational assembly of claim 7, wherein the flange diameter less than or equal to approximately 12.7 millimeters.

10. The rotational assembly of claim 7, wherein the wherein the first body portion includes a cylindrical geometry, wherein the third diameter is a first body diameter that is less than or equal to approximately 5.3 millimeters and a first body height is less than or equal to approximately 3.6 millimeters.

11. The rotational assembly of claim 7, wherein the second body portion includes a cylindrical geometry, wherein the fourth diameter is a second body diameter that is less than or equal to approximately 8.5 millimeters and a second body height is less than or equal to approximately 7.5 millimeters.

* * * * *